United States Patent [19]

Röhm et al.

[11] Patent Number: 4,966,375
[45] Date of Patent: Oct. 30, 1990

[54] LATHE CHUCK FOR OFFECENTER WORKPIECE ROTATION

[76] Inventors: Günter H. Röhm, Heinrich-Röhm-Str. 50, D-7927 Sontheim; Manfred Kolmberger, Keltenstrasse 11, Dillingen-Hausen, both of Fed. Rep. of Germany

[21] Appl. No.: 387,173

[22] Filed: Jul. 28, 1989

[30] Foreign Application Priority Data

Aug. 19, 1988 [DE] Fed. Rep. of Germany ....... 3828162

[51] Int. Cl.⁵ .............................................. B23B 5/22
[52] U.S. Cl. ...................................... 279/6; 279/1 C; 279/1 J; 279/106; 279/121
[58] Field of Search ............... 279/6, 106, 108, 1 C, 279/1 L, 1 J, 110, 121; 82/165

[56] References Cited

U.S. PATENT DOCUMENTS

| | | | |
|---|---|---|---|
| 3,373,641 | 3/1968 | Hermann | 82/165 |
| 4,044,638 | 8/1977 | Heffron et al. | 82/165 X |
| 4,669,741 | 6/1987 | Röhm | 279/6 X |

FOREIGN PATENT DOCUMENTS

152306  7/1986  Japan ....................... 279/6

*Primary Examiner*—Steven C. Bishop
*Attorney, Agent, or Firm*—Herbert Dubno; Andrew M. Wilford

[57] ABSTRACT

A chuck has a chuck body generally centered on and rotatable about a rotation axis, a head displaceable on the chuck body generally perpendicular to the rotation axis, and three jaws angularly generally equispaced on the head about a clamp axis offset from and substantially parallel to the rotation axis. All of these jaws are displaceable on the head generally radially of the clamp axis. An actuator is connected to the jaws for synchronously displacing same generally radially toward and away from the clamp axis. The actuator includes an actuator member displaceable axially in the head and provided with respective actuating surfaces inclined to the clamp axis and engageable with the jaws. Two of the jaws are pivotal about respective jaw axes parallel to the axes and the other jaw is displaceable in a plane substantially including the clamp and rotation axes.

11 Claims, 8 Drawing Sheets

LATHE CHUCK FOR OFFCENTER WORKPIECE ROTATION

FIELD OF THE INVENTION

The present invention relates to a chuck for holding a workpiece in a lathe or the like. More particularly this invention concerns such a chuck which holds the workpiece for rotation about an axis that is radially offset from the center axis of the part of the workpiece held in the chuck.

BACKGROUND OF THE INVENTION

In the machining of some specialty workpieces, for instance a crank shaft, it is necessary to fit the ends of the workpiece into chucks at locations offset radially from the axis of rotation of the chucks. With a crankshaft it is necessary to hold the shaft by its ends even when machining the shaft portions that the piston rods engage, these shaft portions being parallel to but offset from the shaft ends.

The chuck for such a machining operation typically has a chuck body that is rotated about the chuck axis and a head that can be moved on the body perpendicular to the chuck axis to adjust for the eccentricity of the workpiece. This head carries an abutment peg and two jaws that can be moved relative to the abutment peg to clamp the workpiece to it. Thus the head is set so that the abutment peg is spaced the desired distance from the clamping axis, the workpiece is held on the peg, and the jaws are actuated to clamp the workpiece.

The disadvantage of this arrangement is that the part of the workpiece being clamped can vary somewhat in diameter. This variation, even if the part is perfectly on center, will be reflected in the radial offset of the rotation axis from the clamp axis. In other words the distance between the clamp and the rotation axes is determined by the position of the head on the chuck body as well as by the diameter of the workpiece part being clamped. If the part diameter changes significantly it is necessary to reset the head, even if the same offset is desired between the clamp and rotation axes.

OBJECTS OF THE INVENTION

It is therefore an object of the present invention to provide an improved chuck for off-center rotation of a workpiece.

Another object is the provision of such an improved chuck for off-center rotation of a workpiece which overcomes the above-given disadvantages, that is which allows the spacing of the rotation and clamp axes to be set and to stay the same even if the workpiece diameter changes.

SUMMARY OF THE INVENTION

A chuck according to this invention has a chuck body generally centered on and rotatable about a rotation axis, a head displaceable on the chuck body generally perpendicular to the rotation axis, and three jaws angularly generally equispaced on the head about a clamp axis offset from and substantially parallel to the rotation axis. All of these jaws are displaceable on the head generally radially of the clamp axis. An actuator is connected to the jaws for synchronously displacing same generally radially toward and away from the clamp axis.

Thus even if the workpiece stub that is to be held in the jaws varies somewhat in diameter, the workpiece will still be chucked with the exact same offset between the rotation and clamp axes. The clamp axis is set at the center of the part of the workpiece held in the jaws, not at a predetermined spacing from an abutment fixed on the chuck head.

In accordance with a further feature of this invention the actuator includes an actuator member displaceable axially in the head and provided with respective actuating surfaces inclined to the clamp axis and engageable with the jaws. Two of the jaws are pivotal about respective jaw axes parallel to the axes and the other jaw is displaceable in a plane substantially including the clamp and rotation axes.

Furthermore the pivotal jaws have inner ends engageable with the workpiece around the clamp axis and outer ends provided with angled faces engaging the respective surfaces of the actuator member. The actuator member is formed with a notch in which the other jaw lies and is formed with at least one angled tooth forming the surface engageable with the other jaw. The inclinations of the surfaces are such that all the jaws move synchronously at least in the last stages of closing.

More particularly according to the invention the actuator member is displaceable through a stroke having a working part during which it is engaged with all three jaws and a fast-action part during which it is engaged only with the pivotal jaws. The actuating surfaces are more steeply inclined in the regions contacting the pivotal jaws during the fast-action part than during the working part. Thus it is possible when the pivotal jaws are swung all the way out by the fast-action mode to slip a workpiece into place between them, something particularly useful as it allows loading a lathe without having to axially displace the tailstock.

The pivotal jaws according to this invention each have a two-part actuation groove and the actuator member has a pair of ends engaged in the grooves for cammingly pivoting the pivotal jaws. These grooves each have a portion engaged by the respective end only during the working part of the stroke which forms relative to the axes a relatively flat angle and a portion engaged by the respective end only during the fast-action part of the stroke which forms relative to the axes a relatively steep angle. Furthermore, the jaws all have outer surfaces lying generally in a common plane spaced from the head and substantially perpendicular to the axes.

In accordance with a further feature of this invention counterweights are displaceable on the head parallel to the plane like the head on the body and the displacement means are provided, in order not to themselves create offcenter imbalances, generally on the plane.

DESCRIPTION OF THE DRAWING

The above and other objects, features, and advantages will become more readily apparent from the following, reference being made to the accompanying drawing in which:

FIG. 4.1 is a large-scale view of the jaws and actuating mechanism of the shuck in the closed position;

FIGS. 4.2 and 4.3 are sections taken respectively along lines IV.2—IV.2 and IV.3—IV.3 of FIG. 4.1;

FIGS. 5.1, 5.2, and 5.3 are views corresponding to FIGS. 4.1, 4.2. and 4.3, respectively, but showing the chuck in the open position;

DETAILED DESCRIPTION

Figure 1:
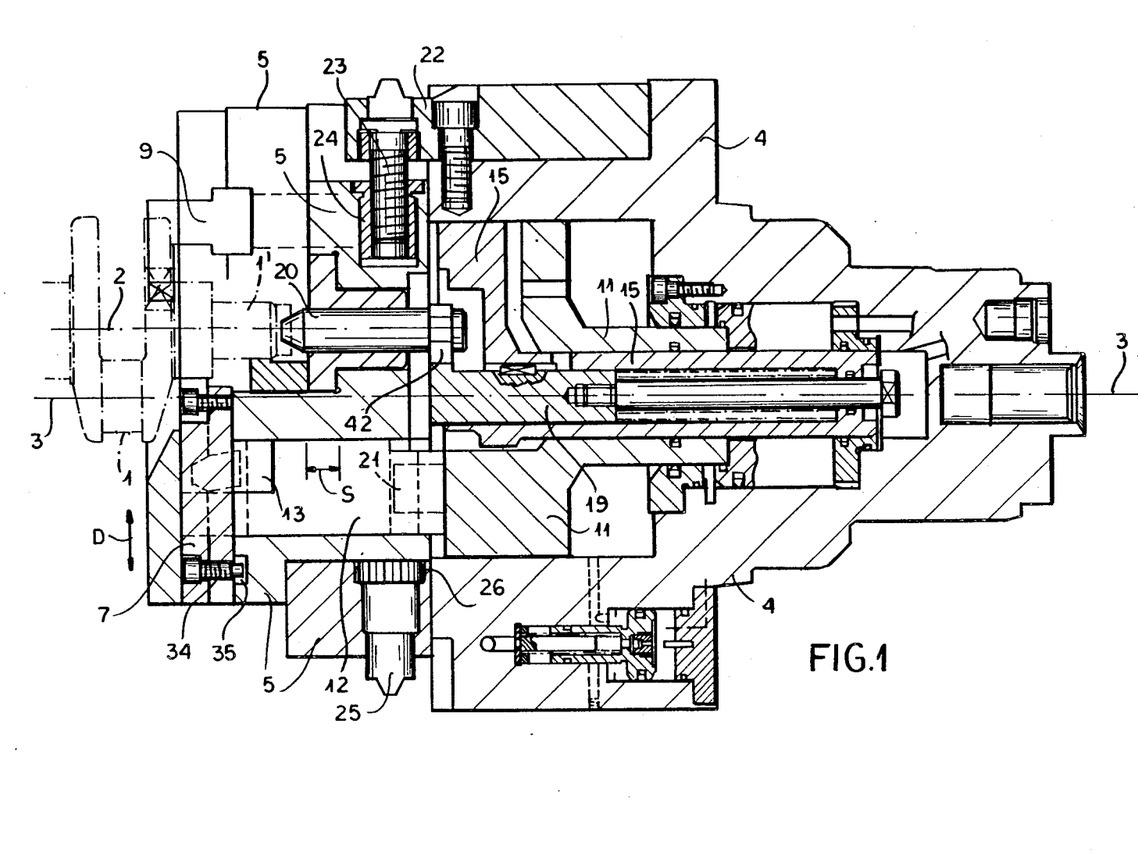
FIG. 1 is an axial section through a chuck according to this invention.
Figure 2:
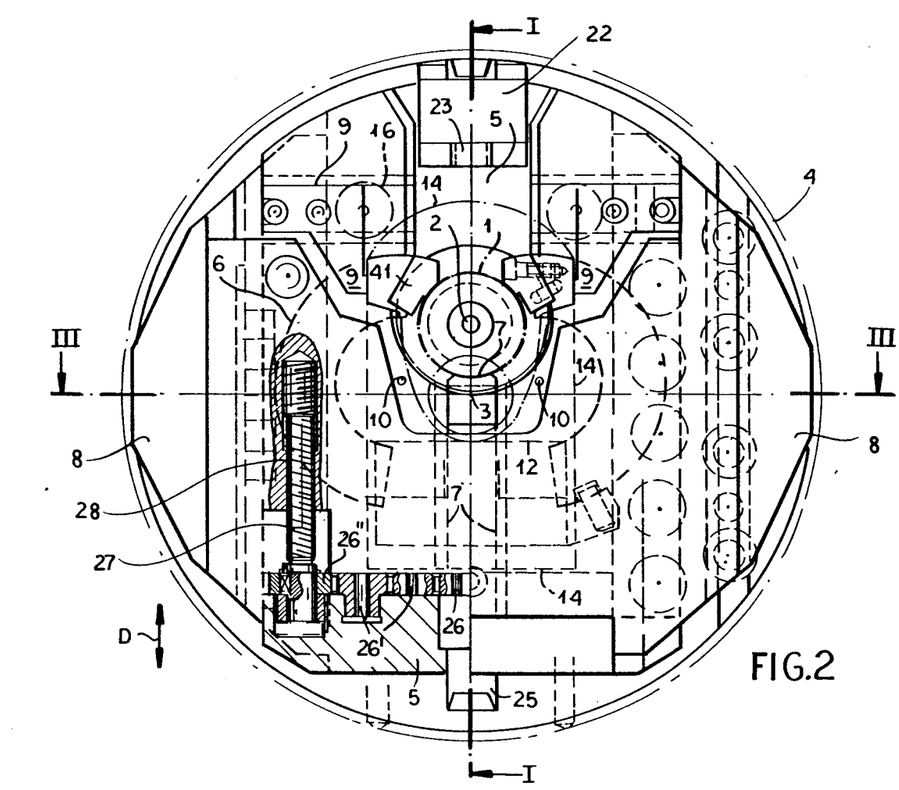
FIG. 2 is a partly sectional end view of the chuck, line I—I of FIG. 2 indicating the section plane of FIG. 1.
Figure 3:
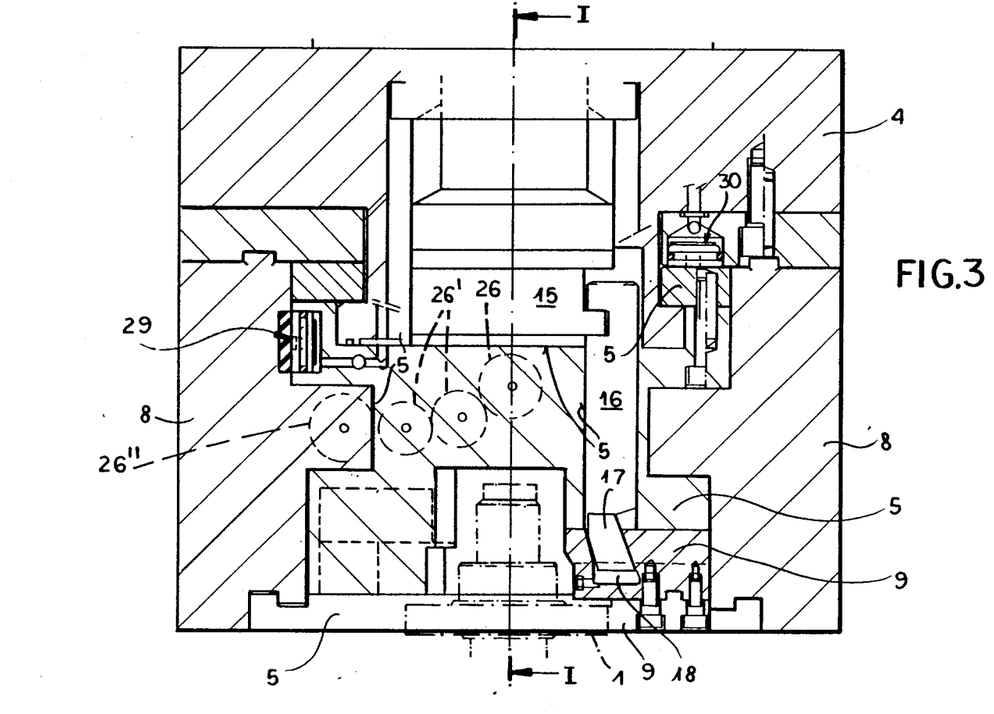
FIG. 3 is an axial section taken along line III—III of FIG. 2, with once again the section plane of FIG. 1 indicated at I—I.
Figure 6:
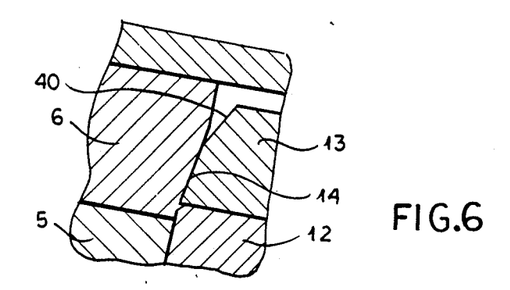
FIG. 6 is a section taken along line VI—VI of FIG. 4.1.
Figure 7:
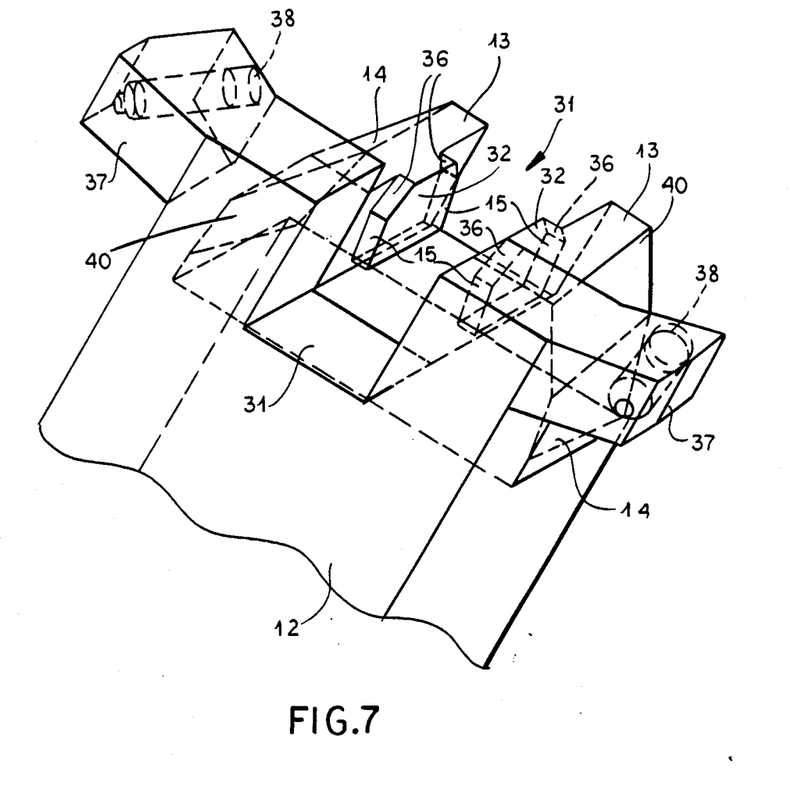
FIG. 7 is a perspective view of the actuating mechanism.
Figure 41:
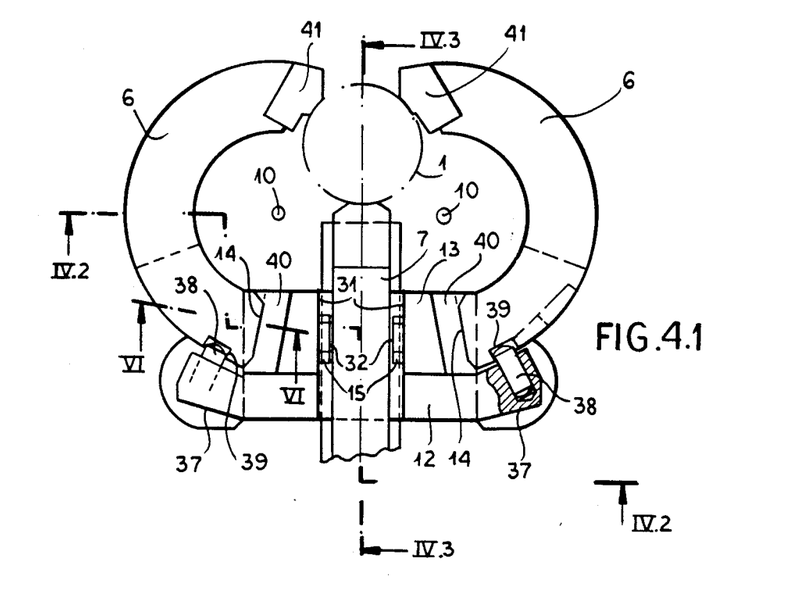

As seen in FIGS. 1 through 3 a chuck according to this invention is used for grinding a crankshaft 1 shown in dot-dash lines 1 which is intended to rotate about an axis 2 but which has at least one crank centered on an axis 3 that is parallel to but offset from the axis 2. The chuck itself must therefore rotate about this axis 3 and has a massive chuck body 4 that is typically mounted on a standard lathe headstock or tailstock for rotation about this axis 2.

The front (left-hand in FIG. 1) face of the chuck body 4 is provided with a head 5 that can move limitedly relative to the body 1 in a direction D perpendicular to the axis A and vertical as shown in FIGS. 1 and 2 but that is axially fixed on this body 4. This head 5 in turn carries jaws 6 and one jaw 7 adapted to engage a stub end 1' of the workpiece 1 as well as a pair of counterweights 8 and centering jaws 9. The counterweights 8 are displaceable parallel to the displacement direction D of the head 5 but oppositely thereto to keep the center of mass of the chuck on the axis 3 and the jaws 9 are used to preliminarily center the workpiece 1.

The jaws 6 symmetrically flank a symmetry plane corresponding to the section plane I—I and are both arcuate and centered on respective axes 10 about which they can pivot to bring clamping ends 41 radially of the axis 2 into engagement with the workpiece 1. The jaw 9 moves in a straight line radially of the axis 2 in the head 5 parallel to the direction D. These displacements are controlled by a main actuation piston 11 in the chuck body 4 that is coupled by a T-slot formation 21 to another actuating piston 12 that is axially displaceable in the head 5. The formation 21 ensures that axial displacement of the piston 11 is transmitted in both directions to the piston 12 regardless of the relative radial positions of the body 4 and head 5.

The piston 12 carries an actuation wedge 13 that coacts with faces 14 of the jaws 6 to jointly and synchronously displace them about their axes 10. Another actuating member 15 in the piston 11 is connected via bolts 16 (FIG. 3) to angled actuating fingers 17 that fit in complementarily angled actuating holes 18 of the jaws 9 so that axial displacement of this member 15 displaces the jaws 9 in a straight line perpendicular to the direction D. These jaws 9 can hold one of the cheeks of the crankshaft workpiece 1. A spring-loaded rod 19 inside the piston 15 carries a centering pin 20 that projects at the axis 2 from the head 5 and serves to center the workpiece stub 1', this pin 20 being slidable limitedly radially in a slot 42 formed in a flange at the front end of the rod 19.

Displacement in the direction D of the head 5 on the chuck 4 is controlled by a threaded bolt 23 extending in the direction D and having a head captured in a bushing 22 on the body 4 and a threaded shaft engaged in a threaded sleeve 24 fixed in the head 5. Rotation of this bolt 23 therefore moves the head 5 and everything carried on it—the jaws 6, 7, and 9, the counterweights 8, and the centering pin 20—in the direction D relative to the body 4 to adjust for the eccentricity of the clamping axis 2 relative to the chuck axis 3. A hydraulic lock 30 is provided that is pressurized when the jaws 6 and 7 are clamped on the workpiece to prevent any relative movement of the body 4 and head 5.

The counterweights 8 in turn are displaced on the head 5 in the direction D by rotation of a pin 25 about an axis parallel to the direction D. This pin 25 carries a pinion 26 meshing via gear trains 26' with respective pinions 26" carried on bolts 27 threaded in bushings 28 fixed in the counterweights 8. Thus once the desired eccentricity is set, the pin 25 is rotated until the counterweights 8 eliminate any throw. Further hydraulic locks 29 like the lock 30 are provided to arrest these counterweights when the chuck is in use.

As best seen in FIGS. 4.1 through 7 the actuation surfaces 14 of the wedge 13 engage corresponding angled surfaces 14' at the ends of the jaws 6 opposite their heads 41. Between these surfaces 14 the wedge 13 is formed with a notch 31 receiving the jaw 7 and the sides of this notch 31 are formed with angled teeth 32 engaging in complementarily angled groove 33 in the sides of the jaw 7. These teeth 32 are formed with actuation surfaces 43 that engage complementary surfaces 43' of the jaw 7 as best seen in FIGS. 4.3 and 5.3. By appropriately angling the surfaces 14, 14', 43, and 43' the inner ends of all the jaws 6 will, on axial displacement of the member 13, move radially at the same speed relative to the axis 2, so that they always lie on the surface of an imaginary cylinder centered on the axis 2.

In order to open the jaws 6 fully to fit a workpiece to the chuck, the stroke S of the actuator element 11 and 12 and of the wedge 13 is subdivided into a rear fast-action part FS and a front slow-action working part WS. The surfaces 43 pull completely out of engagement with the surfaces 43' in the fast-action part FS of the stroke S so that the jaw 7 is not moved in the fast part FS. To prevent it from dropping out of the chuck, it is provided as seen in FIG. 1 with a screw 34 which engages in a short slot 35 extending in the direction D.

Figure 43:
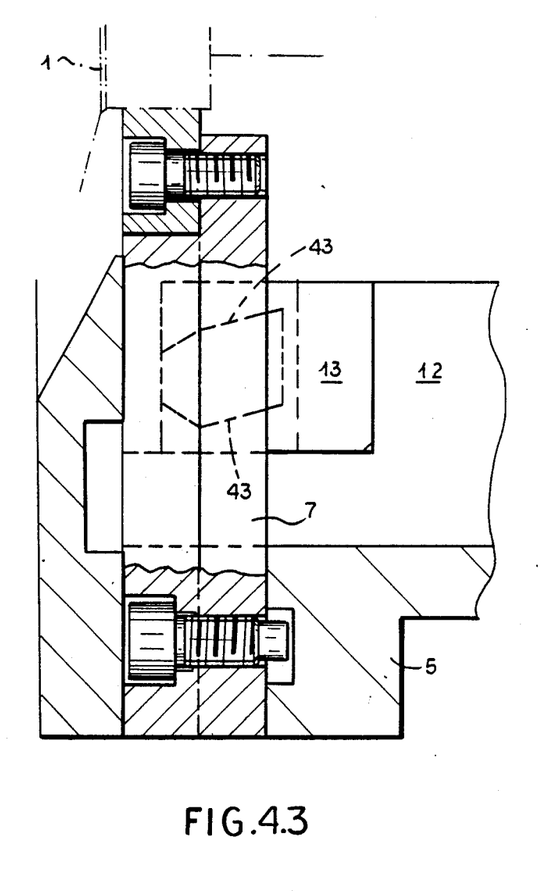
Figure 51:
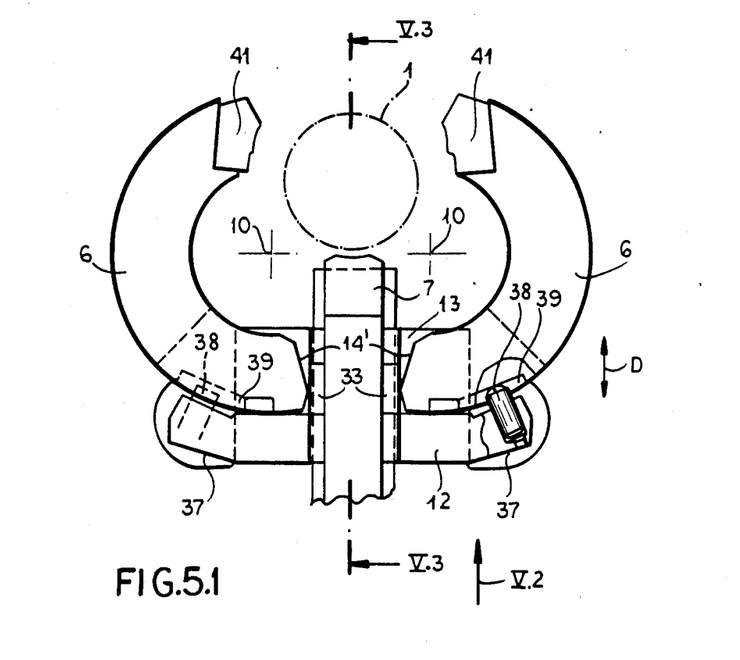
Figure 53:
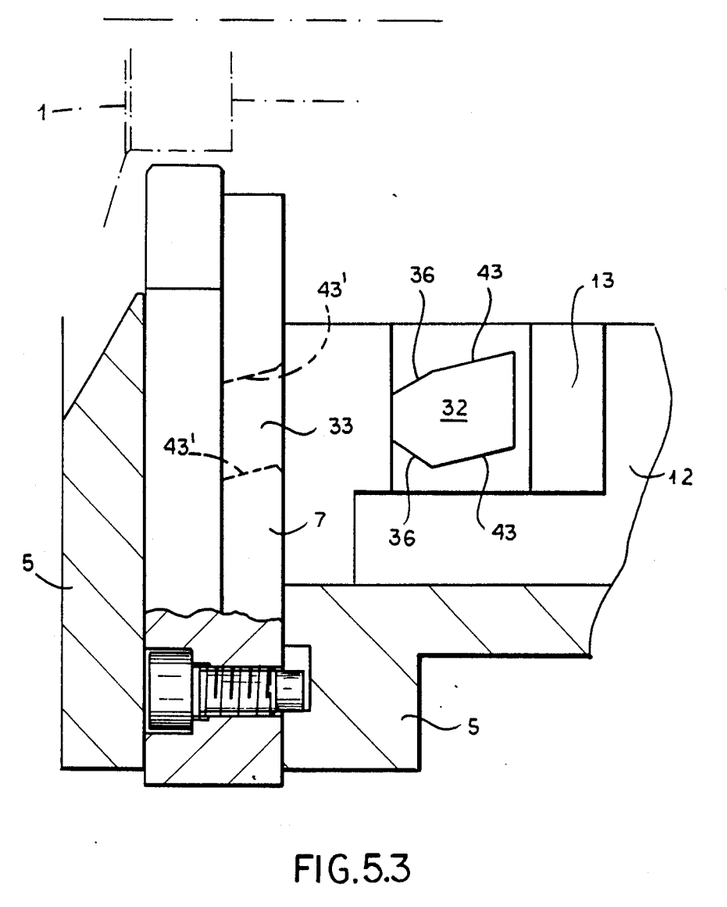

The jaws 6, however, remain in engagement with sharply angled end portions 40 (see FIG. 6) of the surfaces 13 during the fast-action stroke FS so that at this time they are swung radically out, leaving a substantial amount of room for a workpiece to be fitted between these jaws 6. As seen in FIGS. 4.3 and 5.3 the front ends of the teeth 32 are chamfered at 36, forming sharply angled portions that ensure that these teeth 32 will engage in the respective grooves 33 even if the jaw 7 moves while out of engagement with the actuator 13.

Figure 42:
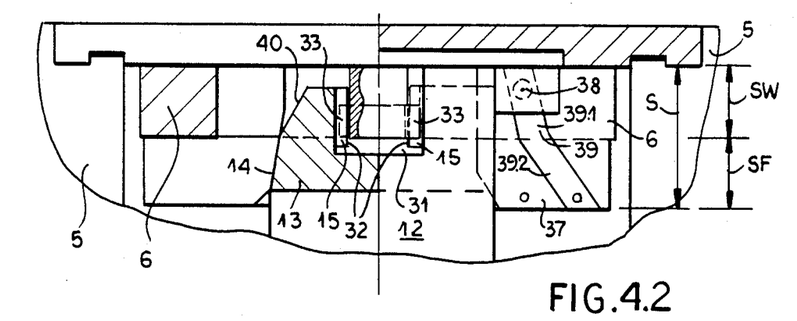
Figure 52:
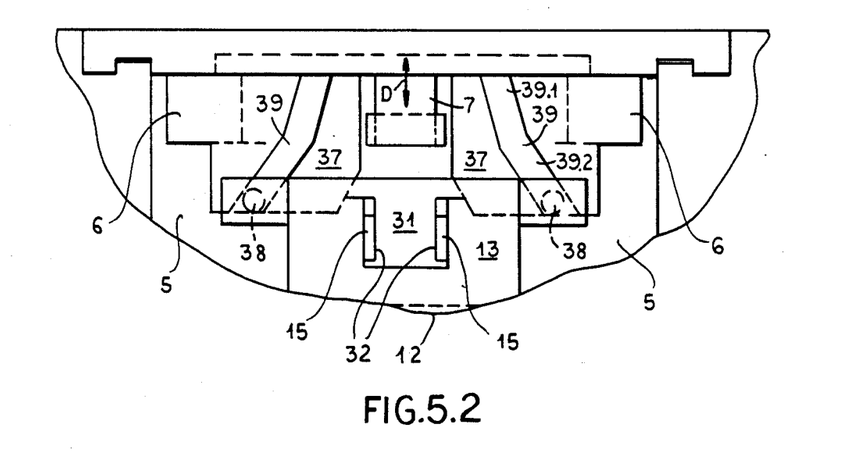

As seen in FIGS. 4.2 and 5.2, in addition to the interfitting actuating formations 13, the piston 12 is provided with outriggers 37 having pins 38 that engage in V-shaped slots 39 in the back of the jaws 6. These slots have front sections 39.1 that form a relatively small angle to the direction D and that correspond to the working stroke part WS and rear sections 39.2 that form a larger angle and that correspond to the fast stroke part FS. Thus the jaws 6 are positively cammed inward and outward as the actuators 11 and 12 are moved axially through their strokes S.

I claim:
1. A chuck comprising:
 a chuck body generally centered on and rotatable about a rotation axis;

a head displaceable on the chuck body generally perpendicular to the rotation axis;

three jaws angularly generally equispaced on the head about a clamp axis offset from and substantially parallel to the rotation axis, each of the jaws being displaceable on the head generally radially of the clamp axis, two of the jaws being pivotal about respective jaw axes parallel to the clamp and rotation axes and the other jaw being displaceable in a plane substantially including the clamp and rotation axes; and actuator means connected to the jaws including an actuator member displaceable axially in the head and provided with respective actuating surfaces inclined to the clamp axis and engageable with the jaws for synchronously displacing same generally radially toward and away from the clamp axis.

2. The chuck defined in claim 1 wherein the pivotal jaws have inner ends engageable with the workpiece around the clamp axis and outer ends provided with angled faces engaging the respective surfaces of the actuator member.

3. The chuck defined in claim 2 wherein the actuator member is formed with a notch in which the other jaw lies and is formed with at least one angled tooth forming the surface engageable with the other jaw.

4. The chuck defined in claim 1 wherein the actuator member is displaceable through a stroke having a working part during which it is engaged with all three jaws and a fast-action part during which it is engaged only with the pivotal jaws, the surfaces being more steeply inclined in the regions contacting the pivotal jaws during the fast-action part than during the working part.

5. The chuck defined in claim 1 wherein the pivotal jaws each have a two-part actuation groove and the actuator member has a pair of ends engaged in the grooves for cammingly pivoting the pivotal jaws, the grooves each having a portion engaged by the respective end only during the working part of the stroke which forms relative to the axes a relatively flat angle and a portion engaged by the respective end only during the fast-action part of the stroke which forms relative to the axes a relatively steep angle.

6. The chuck defined in claim 1 wherein the jaws all have outer surfaces lying generally in a common plane spaced from the head and substantially perpendicular to the axes.

7. The chuck defined in claim 1, further comprising counterweights displaceable on the head parallel to the plane; and means for displacing the counterweights parallel to the plane and locking them in position on the head.

8. The chuck defined in claim 7 wherein the displacing means is situated generally on the plane.

9. The chuck defined in claim 1, further comprising means for displacing the head on the body generally parallel to the plane and locking it in position on the body.

10. The chuck defined in claim 9 wherein the displacing means is situated generally on the plane.

11. A chuck comprising:

a chuck body generally centered on and rotatable about a rotation axis;

a head displaceable on the chuck body in a displacement direction substantially perpendicular to the rotation axis;

three jaws angularly generally equispaced on the head about a clamp axis offset from and substantially parallel to the rotation axis and substantially parallel to the direction, two of the jaws having ends pivotal on the head generally radially of the clamp axis and the other jaw being slidable in the head-displacement direction on the head; and actuator means including respective cam formations engageable with to the jaws for synchronously displacing same generally radially toward and away from the clamp axis.

* * * * *